United States Patent
Chen et al.

(10) Patent No.: US 8,364,844 B2
(45) Date of Patent: Jan. 29, 2013

(54) DEADLOCK-FREE CLASS ROUTES FOR COLLECTIVE COMMUNICATIONS EMBEDDED IN A MULTI-DIMENSIONAL TORUS NETWORK

(75) Inventors: Dong Chen, Yorktown Heights, NY (US); Noel A. Eisley, Yorktown Heights, NY (US); Burkhard Steinmacher-Burow, Boeblingen (DE); Philip Heidelberger, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 12/697,015

(22) Filed: Jan. 29, 2010

(65) Prior Publication Data

US 2011/0119399 A1    May 19, 2011

Related U.S. Application Data

(60) Provisional application No. 61/261,269, filed on Nov. 13, 2009, provisional application No. 61/293,611, filed on Jan. 8, 2010, provisional application No. 61/295,669, filed on Jan. 15, 2010, provisional application No. 61/293,554, filed on Jan. 8, 2010.

(51) Int. Cl.
*G06F 15/173* (2006.01)

(52) U.S. Cl. .................... 709/242; 709/238; 709/240

(58) Field of Classification Search ........... 709/238–244
See application file for complete search history.

(56) References Cited

U.S. PATENT DOCUMENTS

| | | | |
|---|---|---|---|
| 5,689,646 A * | 11/1997 | Thorson | 709/239 |
| 6,408,002 B1 * | 6/2002 | Quattromani et al. | 370/394 |
| 7,587,516 B2 * | 9/2009 | Bhanot et al. | 709/238 |
| 7,650,434 B2 | 1/2010 | Blumrich et al. | |
| 2006/0227774 A1 * | 10/2006 | Hoenicke | 370/389 |
| 2008/0084889 A1 * | 4/2008 | Archer et al. | 370/400 |
| 2008/0263386 A1 * | 10/2008 | Darrington et al. | 714/4 |
| 2009/0046727 A1 * | 2/2009 | Towles | 370/397 |
| 2010/0325308 A1 * | 12/2010 | Keckler et al. | 709/238 |

OTHER PUBLICATIONS

Dally "Deadlock-Free Message Routing in Multiprocessor Interconnection Networks" IEEE Transactions on Computers, vol C-36, No. 5, May 1987.

Duato "A General Theory for Deadlock-Free Adaptive Routing Using a Mixed Set of Resources" IEEE Transactions on Parallel and Distributed Systems, vol. 12, No. 12, Dec. 2001.

* cited by examiner

*Primary Examiner* — Joshua Joo

(74) *Attorney, Agent, or Firm* — Scully, Scott, Murphy & Presser, P.C.; Daniel P. Morris, Esq.

(57) ABSTRACT

A computer implemented method and a system for routing data packets in a multi-dimensional computer network. The method comprises routing a data packet among nodes along one dimension towards a root node, each node having input and output communication links, said root node not having any outgoing uplinks, and determining at each node if the data packet has reached a predefined coordinate for the dimension or an edge of the subrectangle for the dimension, and if the data packet has reached the predefined coordinate for the dimension or the edge of the subrectangle for the dimension, determining if the data packet has reached the root node, and if the data packet has not reached the root node, routing the data packet among nodes along another dimension towards the root node.

24 Claims, 6 Drawing Sheets

The root node coordinate for the X dimension is 2
The root node coordinate for the Y dimension is 2

In logical tree B, the packets change dimension at the same nodes as the tree on the entire plane In logical tree A, the packets change from X to Y at the edge of the sub rectangle

DEADLOCK-FREE CLASS ROUTES FOR COLLECTIVE COMMUNICATIONS EMBEDDED IN A MULTI-DIMENSIONAL TORUS NETWORK

CROSS-REFERENCE TO RELATED APPLICATIONS

This application claims the benefit of U.S. Patent Application Ser. Nos. 61/293,554, filed Jan. 8, 2010, for "TWO DIFFERENT PREFETCHING COMPLEMENTARY ENGINES OPERATING SIMULTANEOUSLY"; 61/261,269, filed Nov. 13, 2009 for "LOCAL ROLLBACK FOR FAULT-TOLERANCE IN PARALLEL COMPUTING SYSTEMS"; 61/293,611, filed Jan. 8, 2010 for "A MULTI-PETASCALE HIGHLY EFFICIENT PARALLEL SUPERCOMPUTER"; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of each of which is incorporated herein by reference; and is related to the following commonly-owned, co-pending United States Patent Applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,502, for "MEMORY SPECULATION IN A MULTI LEVEL CACHE SYSTEM"; U.S. patent application Ser. No. 13/008,583, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287, filed Jan. 8, 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATAFLOW"; U.S. patent application Serial No. for "EMBEDDING GLOBAL BARRIER AND COLLECTIVE IN A TORUS NETWORK"; U.S. patent application Ser. No. 61/293,499, filed Jan. 8, 2010 for "GLOBAL SYNCHRONIZATION OF PARALLEL PROCESSORS USING CLOCK PULSE WIDTH MODULATION"; U.S. patent application Ser. No. 61/293,266, filed Jan. 8, 2010 for "IMPLEMENTATION OF MSYNC"; U.S. patent application Ser. No. 12/796,389 for "NON-STANDARD FLAVORS OF MSYNC"; U.S. patent application Ser. No. 12/696,817 for "HEAP/STACK GUARD PAGES USING A WAKEUP UNIT"; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 12/774,475 for "REPRODUCIBILITY IN A MULTIPROCESSOR SYSTEM".

STATEMENT OF GOVERNMENT RIGHTS

This invention was made with government support under Contract No. B554331 awarded by the Department of Energy. The Government has certain rights in the invention

BACKGROUND

The present invention relates to routing data through a parallel computing system, and more particularly to selecting a routing path for collective operations in the parallel computer system.

A large parallel computer system, such as IBM's BLUEGENE™ parallel computer system, has many nodes interconnected with each other. In the IBM BLUEGENE™ parallel computer system, each node is interconnected along multiple dimensions in a torus topology. For example, the IBM BLUEGENE™/L or P parallel computer system can be configured as a three-dimensional network topology.

Prior art IBM BLUEGENE™/L and P parallel computer systems use a separate collective network, such as the logical tree network disclosed in commonly assigned U.S. Pat. No. 7,650,434, for performing collective communication operations. The uplinks and downlinks between nodes in such a collective network needed to be carefully constructed to avoid deadlocks between nodes when communicating data. In a deadlock, packets cannot move due to the existence of a cycle in the resources required to move the packets. In networks these resources are typically buffer spaces in which to store packets.

If logical tree networks are constructed carelessly, then packets may not be able to move between nodes due to a lack of storage space in a buffer. For example, a packet (packet 1) stored in a downlink buffer for one logical tree may be waiting on another packet (packet 2) stored in an uplink buffer of another logical tree to vacate the buffer space. Furthermore, packet 2 may be waiting on a packet (packet 3) in a different downlink buffer to vacate its buffer space and packet 3 may be waiting for packet 1 to vacate its buffer space. Thus, none of the packets can move into an empty buffer space and a deadlock ensues. While there is prior art for constructing deadlock free routes in a torus for point-to-point packets (Daily "Deadlock-Free Message Routing in Multiprocessor Interconnection Networks" IEEE TRANSACTIONS ON COMPUTERS, VOL. C-36, NO. 5, MAY 1987 and Duato "A General Theory for Deadlock-Free Adaptive Routing Using a Mixed Set of Resources" IEEE TRANSACTIONS ON PARALLEL AND DISTRIBUTED SYSTEMS, VOL. 12, NO. 12, DECEMBER 2001), there are no specific rules for constructing deadlock free collective class routes in a torus network, nor is it obvious how to apply Duato's general rules in such a way to avoid deadlocks when constructing multiple virtual tree networks that are overlayed onto a torus network. If different collective operations are always separated by barrier operations (that do not use common buffer spaces with the collectives nor block on common hardware resources as the collectives), then the issue of deadlocks does not arise and class routes can be constructed in an arbitrary manner. However, this increases the time of the collective operations and therefore reduces performance.

Thus, there is a need in the art for a method and system for performing collective communication operations within a parallel computing network without the use of a separate collective network and in which multiple logical trees can be embedded (or overlayed) within a multiple dimension torus network in such a way as to avoid the possibility of deadlocks. Virtual channels (VCs) are often used to represent the buffer spaces used to store packets. It is further desirable to have several different logical trees using the same VC and thus sharing the same buffer spaces

SUMMARY

A computer implemented method and a system for constructing routes for data packets for collective operations in a multi-dimensional computer network is provided. In one embodiment, the method comprises routing a data packet among nodes along one dimension towards a root node, each node having input and output communication links, said root node not having any outgoing uplinks, and determining at each node if the data packet has reached a predefined coordinate for the dimension or an edge of the subrectangle for the dimension, and if the data packet has reached the predefined coordinate for the dimension or the edge of the subrectangle for the dimension, determining if the data packet has reached the root node, and if the data packet has not reached the root node, routing the data packet among nodes along another dimension towards the root node.

In one embodiment, the rules comprise routing the uptree packets in the same dimension order (e.g., first along the 'e' dimension, then along the 'a' dimension, then along the 'b' dimension, then along the 'c' dimension, then along the dimension) for all logical trees. The rules also comprise routing the data packets in an "outside-inside" manner, in which for each dimension a 'pre-determined' coordinate is selected for each dimension and uptree packets are always routed towards that pre-determined coordinate. Upon reaching the pre-determined coordinate or the edge of the subrectangle in that dimension, the data packets are routed toward the pre-determined coordinate of the next dimension, until the data packet reaches the root node of the logical tree, upon which the data packets are sent back down the logical tree in the opposite order.

In one embodiment, a system comprising a multi-dimensional computer network, said network comprising a plurality of interconnected compute nodes, said network having one or more subrectangles comprising a plurality of nodes, each subrectangle for performing collective operations and each node within each of the said subrectangles comprising a processor operable to route a data packet among nodes along one dimension towards a root node, each node having input and output communication links, said root node not having any outgoing uplinks, and determine at each node if the data packet has reached a predefined coordinate for the dimension or an edge of the subrectangle for the dimension, and if the data packet has reached the predefined coordinate for the dimension or the edge of the subrectangle for the dimension, determine if the data packet has reached the root node, and if the data packet has not reached the root node, route the data packet among nodes along another dimension towards the root node.

A computer readable medium implementing the method is also provided.

DETAILED DESCRIPTION

This invention applies to network communication in a massively parallel computing system, such as the IBM BLUE-GENE™/Q parallel computing system. As described herein, the use of the letter 'B' represents a Byte quantity, e.g., 2 B, 8.0 B, 32 B, and 64 B represent Byte units; 'GB' represent Gigabyte quantities.

Figure 1:
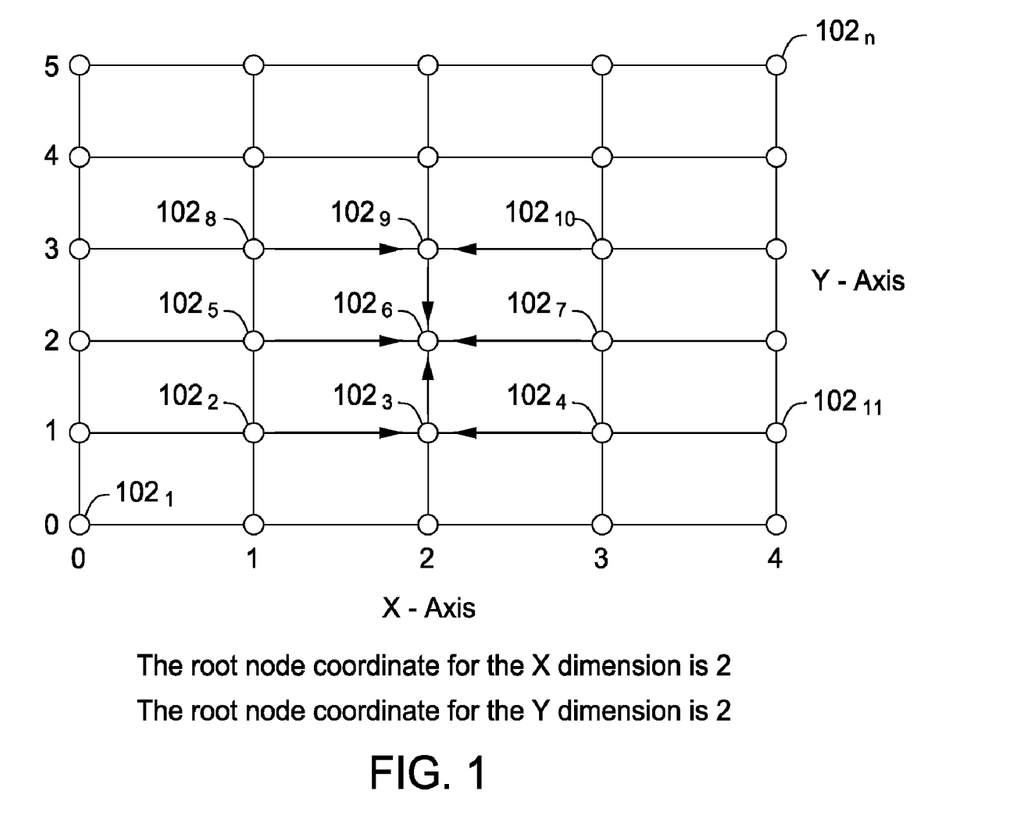
FIG. 1 is an example of a tree network overlayed onto a multi-dimensional torus parallel computing environment.

FIG. 1 is an example of a logical tree overlayed onto a multi-dimensional torus. For simplicity, the multi-dimensional torus shown is a two dimensional torus having X and Y dimensions. However, it is understood that a tree network may be embedded within a three dimensional torus having X, Y and Z dimensions and within a five dimensional torus having a, b, c, d and e dimensions. One embodiment of IBM's BlueGene™ parallel processing computing system, BlueGene/Q, employs a five dimensional torus.

The torus comprises a plurality of interconnected compute nodes $102_1$ to $102_n$. The structure of a compute node 102 is shown in further detail in FIG. 2. The torus may be decomposed into one or more sub-rectangles. A subrectangle is at least a portion of the torus consisting of a contiguous set of nodes in a rectangular shape. In two dimensions, sub-rectangles may be either two-dimensional or one dimensional (a line in either the X or Y dimension). A subrectangle in d dimensions may be one-dimensional, two-dimensional, . . . , d-dimensional and for each dimension consists of nodes whose coordinate in that dimension is greater than or equal to some minimum value and less than or equal to some maximum value. Each subrectangle includes one or more compute nodes and can be arranged in a logical tree topology. One of the compute nodes within the tree topology functions as a 'root node' and the remaining nodes are leaf nodes or intermediate nodes. Leaf nodes do not have any incoming downtree logical links to them and only one outgoing uptree logical link. An intermediate node has at least one incoming logical link and one outgoing uptree logical link. A root node is an endpoint within the tree topology, with at least one incoming logical link and no uptree outgoing logical links. Packets follow the uptree links, and in one example of collective operations, are either combined or reduced as they move across the network. At the root node, the packets reverse direction and are broadcast down the tree, in the opposite direction of the uptree links. As shown in FIG. 1, compute node $102_6$ is a root node, $102_2$, $102_4$, $102_8$ and $102_{10}$ are leaf nodes and $102_3$ and $102_9$ are intermediate nodes. The arrows in FIG. 1 indicate uptree logical links, or the flow of packets up the tree towards the root node. In FIG. 1, packets move uptree first along the X dimension until reaching a predefined coordinate in the X dimension, which happens to be the middle of the subrectangle and then move uptree along the Y dimension until reaching a predefined coordinate in the Y dimension, which also happens to be the middle of the subrectangle. In this example, the root of the logical tree is at the node with the predefined coordinate of both the X and Y dimension. As shown in FIG. 1, the coordinates of the middle of the subrectangle are the same for both the X and Y dimensions in this example, but in general they need not be the same.

The compute nodes 102 are interconnected to each other by one or more physical wires or links. To prevent deadlocks, a physical wire that functions as an uplink for a logical tree on a VC can never function as a downlink in any other virtual tree (or class route) on that same VC. Similarly, a physical wire that functions as a downlink for a particular class route on a VC can never function as an uplink in any other virtual tree on that same VC. Each class route is associated with its own unique tree network. In one embodiment of the IBM Blue-Gene parallel computing system, there are 16 class routes, and thus at least 16 different tree networks embedded within the multi-dimensional torus network that form the parallel computing system.

Figure 2:
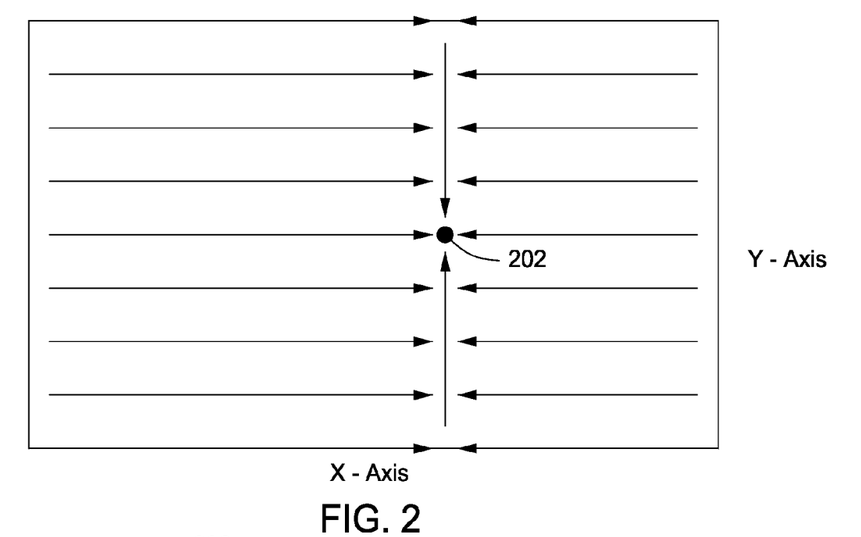
FIG. 2 is one example of a logical tree network whose subrectangle forms the entire XY plane.

FIG. 2 shows a logical uptree consisting of the entire XY plane. In one embodiment of the invention, data packets are always routed towards the 'root node' 202. The 'root node' 202 resides at the intersection of one or more dimensions within the multidimensional network, and only at the 'root node' 202 is the data packet allowed to move from the uptree directions to the downtree directions. Note that packet move in the X dimension until reaching a pre-determined coordinate in the X dimension. Upon reaching that predefined coordinate in the X dimension, the packets move in the Y dimension until reaching a predefined coordinate in the Y dimension, at which point they have reached the 'root node' 202 of the logical tree. The predefined coordinates are the coordinates of the root node 202.

Figure 3:
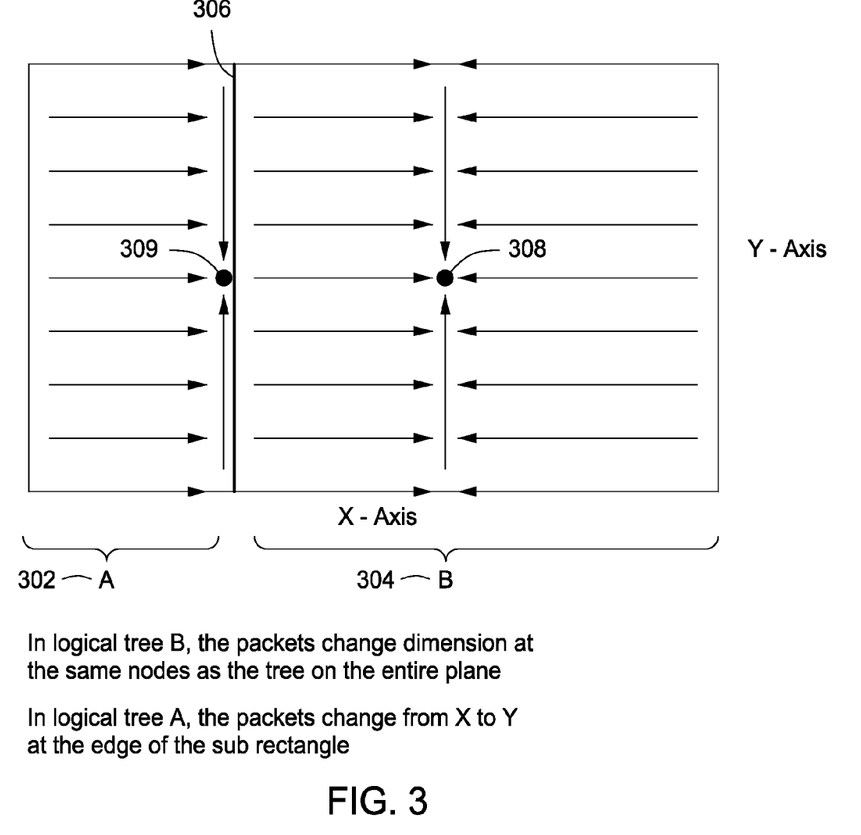
FIG. 3 shows two non overlapping sub-rectangles, A and B, and their corresponding tree networks.

FIG. 3 shows two non overlapping subrectangles, 'A' 302 and B '304' and their corresponding logical trees (shown by the arrows within each subrectangle). Each logical tree is constructed by routing packets in the same dimension order, first in the X dimension and then in the Y dimension. Also, each logical tree is constructed using the same predefined coordinate located at point 308 for each dimension. The predefined coordinates are the coordinates of the node located at point 308 and are the same coordinates as point 202. In this example, the pre-determined coordinate for the X dimension located at point 308 is not contained within subrectangle A 302. Data packets are routed in the X dimension towards the pre-determined coordinate 308 in the X dimension and then change direction from the X dimension to the Y dimension at the 'edge' 306 of the subrectangle A 302 and then routes towards root node 309, which is the root node 309 of subrectangle A 302. The Y coordinate of the root node is the pre-determined coordinate 308 of the Y dimension. For subrectangle B 304, the predefined coordinates for both the X and Y dimensions are contained within subrectangle B 304, so the data packets change dimension (or reach the root node) at the predefined coordinates, just as in the logical tree consisting of the full plane shown in FIG. 2. In one embodiment, all logical trees for all subrectangles use the same dimension order for routing packets and for each dimension all rectangles use the same predefined coordinate in that dimension. Packets route along the first dimension until reaching either the predefined coordinate for that dimension or reaching the edge of the subrectangle of that dimension. The packets then change dimension and route along the new dimension until reaching either the predefined coordinate for that new dimension or reaching the edge of the subrectangle of that new dimension. When this rule has been applied to all dimensions, the packets have reached the root of the logical tree for that subrectangle. Furthermore, if no hops are required in a dimension, that dimension may be skipped and the next dimension selected. For example, in a three-dimensional X, Y, Z cube, a subrectangle may involve only the X and Z dimensions (the Y coordinate is fixed for that sub-rectangle). If the dimension order rule for all sub-rectangles is X, then Y, then Z, then for this subrectangle the packets route X first then Z, i.e., the Y dimension is skipped.

While FIGS. 2 and 3 show sub-rectangles that fill the entire plane, one skilled in the art can recognize that this need not be the case in general, i.e., the sub-rectangles may be arbitrary sub-rectangles of any dimension, up to the dimensionality of the entire network. Furthermore, FIG. 3 shows non-overlapping sub-rectangles A and B that meet at 'edge' 302. Although, in other embodiments the subrectangles may overlap in an arbitrary manner. If the multidimensional network is a torus, the torus may be cut into a mesh and the sub-rectangles are contiguous on the mesh (i.e., if the nodes of the torus in a dimension are numbered 0, 1, 2, . . . N then the links from node 0 to N and N to 0 are not used in the construction of the subrectangles.)

As in BlueGene/L, the logical trees (class routes) can be defined by DCR registers programmed at each node. Each class route has a DCR containing a bit vector of uptree link inputs and one or more local contribution bits and a bit vector of uptree link outputs. If bit i is set in the input link DCR, then that means that an input is required on link i (or the local contribution). If bit i is set in the output link DCR, then uptree packets are sent out link i. At most one output link may be specified at each node. A leaf node has no input links, but does have a local input contribution. An intermediate link has both input links and an output link and may have a local contribution. A root node has only input links, and may have a local contribution. In one embodiment of the invention, all nodes in the tree have a local contribution bit set and the tree defines one or more sub-rectangles. Bits in the packet may specify which class route to use (class route id). As packets flow through the network, the network logic inspects the class route ids in the packets, reads the DCR registers for that class route id and determines the appropriate inputs and outputs for the packets. These DCRs may be programmed by the operating system so as to set routes in a predetermined manner. Note that the example trees in FIG. 2 and FIG. 3 are not binary trees, i.e., there are more than two inputs at some nodes in the logical trees.

In one embodiment, the predetermined manner is routing the data packet in direction of an 'e' dimension, and if routing the data packet in direction of the 'e' dimension is not possible (either because there are no hops to make in the e dimension, or if the predefined coordinate in the e dimension has been reached or if the edge of the subrectangle in the e-dimension has been reached), then routing the data packet in direction of an 'a' dimension, and if routing the data packet in direction of the 'a' dimension is not possible, then routing the data packet in direction of a 'b' dimension, and if routing the data packet in direction of the 'b' dimension is not possible, then routing the data packet in direction of a 'c' dimension, and if routing the data packet in direction of the 'c' dimension is not possible, then routing the data packet in direction of the 'd' dimension.

In one embodiment, routing between nodes occurs in an 'outside-in' manner with compute nodes communicating data packets along a subrectangle from the leaf nodes towards a predefined coordinate in each dimension (which may be the middle coordinate in that dimension) and changing dimension when the node is reached having either the predefined coordinate in that dimension or the end of the subrectangle is reached in a dimension, whichever comes first. Routing data from the 'outside" to the 'inside' until the root of the virtual tree is reached, and then broadcasting the packets down the virtual tree in the opposite direction in such a predetermined manner prevents communication deadlocks between the compute nodes.

In one embodiment, compute nodes arranged in a logical tree overlayed on to a multidimensional network are used to evaluate collective operations. Examples of collective operations include logical bitwise AND, OR and XOR operations, unsigned and signed integer ADD, MIN and MAX operations, and 64 bit floating point ADD, MIN and MAX operations. In one embodiment, the operation to be performed is specified by one or more OP code (operation code) bits specified in the packet header. In one embodiment, collective operations are performed in one of several modes, e.g., single node broadcast mode or "broadcast" mode, global reduce to a single node or "reduce" mode, and global all-reduce to a root node, then broadcast to all nodes or "all reduce" mode. These three modes are described in further detail below.

In the mode known as "ALL REDUCE", each compute node in the logical tree makes a local contribution to the data packet, i.e., each node contributes a data packet of its own data and performs a logic operation on the data stored in that data packet and data packets from all input links in the logical tree at that node before the "reduced" data packet is transmitted to the next node within the tree. This occurs until the data packet finally reaches the root node, e.g., $102_6$. Movement from a leaf node or intermediate node towards a root node is known as moving 'uptree' or 'uplink'. The root node makes another local contribution (performs a logic operation on the data stored in the data packet) and then rebroadcasts the data packet down the tree to the all leaf and intermediate nodes within the tree network. Movement from a root node towards a leaf or intermediate node is known as moving 'downtree' or 'downlink'. The data packet broadcast from the root node to the leaf nodes contains final reduced data values, i.e., local contribution from all the nodes in the tree which are combined according to the prescribed OP code. As the data packet is broadcast downlink the leaf nodes do not make further local contributions to the data packet. Packets are also received at the nodes as they are broadcast down the tree, and every node receives exactly the same final reduced data values.

The mode known as "REDUCE" is exactly the same as "ALL REDUCE", except that the packets broadcast down the tree are not received at any compute node except for one which is specified as a destination node in the packet headers In the mode known as "BROADCAST", a node in the tree makes a local contribution to a data packet and communicates the data packet up the tree toward a root node, e.g., node $102_6$. The data packet may pass through one or more intermediate nodes to reach the root node, but the intermediate nodes do not make any local contributions or logical operations on the data packet. The root node receives the data packet and the root node also does not perform any logic operations on the data packet. The root node rebroadcasts the received data packet downlink to all of the nodes within the tree network.

Figure 4:
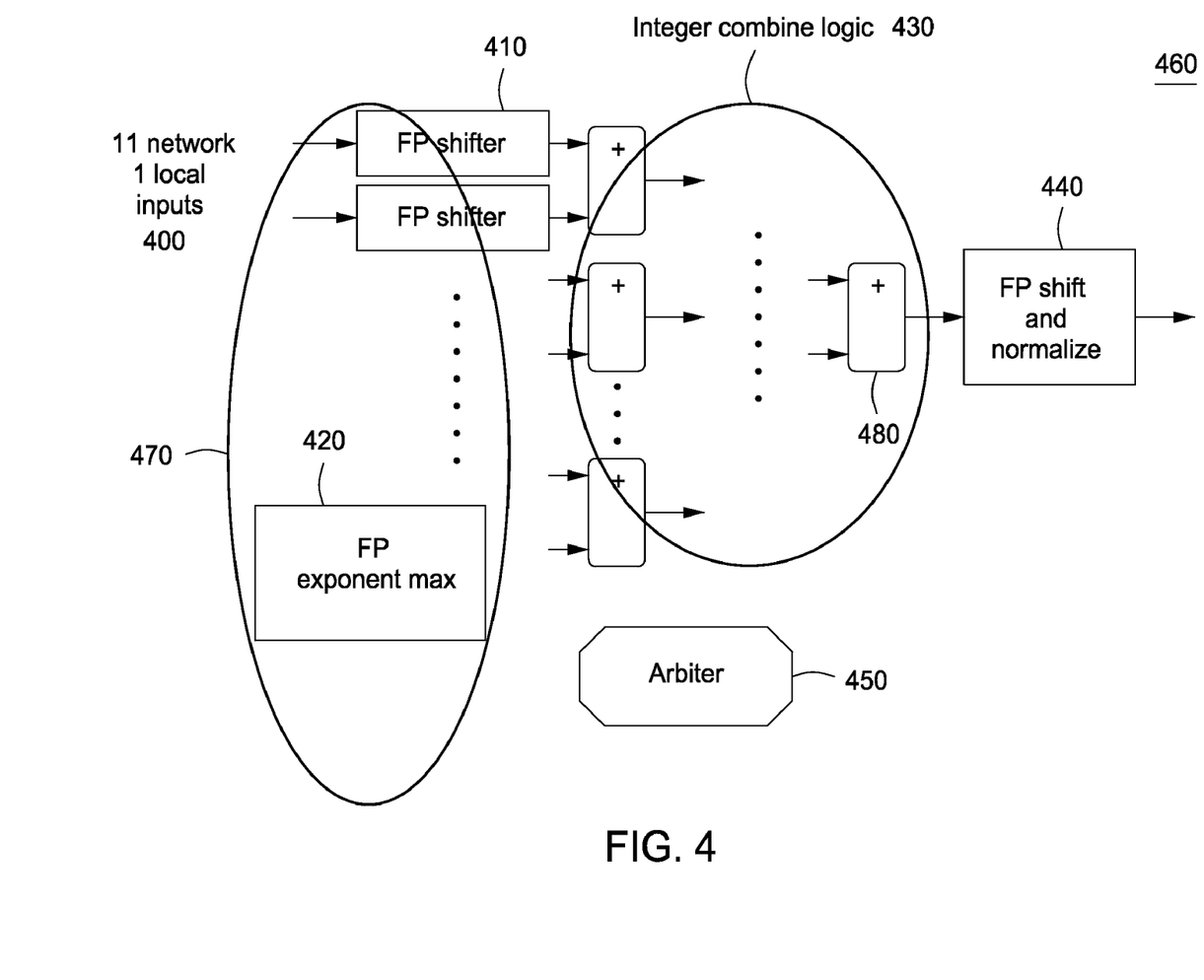
FIG. 4 is one embodiment of a collective logic device.

In one embodiment, packet type bits in the header are used to specify ALL REDUCE, REDUCE or BROADCAST operation. In one embodiment, the topology of the tree network is determined by a collective logic device as shown in FIG. 4. The collective logic device determines which compute nodes can provide input to other compute nodes within the tree network. In a five-dimensional torus such as utilized by IBM's BlueGene™/Q parallel computing system, there are 11 input links into each compute node 102, one input link for each of the +/−a to e dimensions and I/O input link and one local input. Each of these 11 input links and the local contribution from the compute node can be represented by one bit within a 12 bit vector. Based on the class route id in the packets, the collective logic uses a selection vector stored in a DCR register to determine which input links and local contribution are valid at a particular compute node. For example, if the selection vector is "100010000001" then the compute node 102 receives inputs from its neighbor compute node along the '−a' dimension and the '−c' dimension. When the $12^{th}$ bit or local is set, the compute node makes its own local contribution to the data packet by inputting its own packet. The collective logic then performs a logical operation on the data stored in all the input data packets. For an ALL REDUCE or REDUCE operation, the collective logic must wait until data packets from all the inputs have arrived before performing the logical operation and sending the packet along the tree. The collective logic also uses an output vector stored in a DCR register to determine which output links are valid between compute nodes 102 within the tree network. In one embodiment, there are 11 possible output links from each compute node, one output link for each of the +/−a to e dimensions and one I/O link. For example, if the output vector is "00001000000" then the output is routed to the '−c' dimension. In one embodiment, the virtual channel (VC) is also stored in the packets, indicating which internal network storage buffers to use. Packets to be combined must specify the same class route id and the same VC. The software running on the nodes must ensure that for each VC the packets arriving at and being input at each node have consistent class route identifiers and OP codes. For contiguous sub-rectangles, the following software discipline across nodes is required in the use of collectives. For any two nodes that both participate in two class routes, the two nodes must participate in the same order. This is satisfied by typical applications, which use the same program code on all nodes. Each node uses its particular identity to drive its particular execution through the program code. Since the collective calls are ordered in the program code, they are ordered in the execution as required in the software discipline.

FIG. 4 illustrates a collective logic device 460 for adding a plurality of floating point numbers in a parallel computing system (e.g., IBM™ BlueGene™ L\P\Q). The collective logic device 460 comprises, without restriction, a front-end floating point logic device 470, an integer ALU (Arithmetic Logic Unit) tree 430, a back-end floating point logic device 440. The front-end floating point logic device 470 comprises, without limitation, a plurality of floating point number ("FP") shifters (e.g., FP shifter 410) and at least one FP exponent max unit 420. In one embodiment, the FP shifters 410 are implemented by shift registers performing a left shift(s) and/or right shift(s). The at least one FP exponent max unit 420 finds the largest exponent value among inputs 400 which are a plurality of floating point numbers. In one embodiment, the FP exponent max unit 420 includes a comparator to compare exponent fields of the inputs 400. In one embodiment, the collective logic device 460 receives the inputs 400 from network links, computing nodes and/or I/O links. In one embodiment, the FP shifters 410 and the FP exponent max unit 420 receive the inputs 400 in parallel from network links, computing nodes and/or I/O links. In another embodiment, the FP shifters 410 and the FP exponent max unit 420 receive the inputs 400 sequentially, e.g., the FP shifters 410 receives the inputs 400 and forwards the inputs 400 to the FP exponent max unit 420. The ALU tree 430 performs integer arithmetic and includes, without limitations, adders (e.g., an adder 480). The adders may be known adders including, without limitation, carry look-ahead adders, full adders, half adders, carry-save adders, etc. This ALU tree 430 is used for floating point arithmetic as well as integer arithmetic. In one embodiment, the ALU tree 430 is divided by a plurality of layers. Multiple layers of the ALU tree 430 are instantiated to do integer operations over (intermediate) inputs. These integer operations include, but are not limited to: integer signed and unsigned addition, max (i.e., finding a maximum integer number among a plurality of integer numbers), min (i.e., finding a minimum integer number among a plurality of integer numbers), etc.

In one embodiment, the back-end floating point logic device 440 includes, without limitation, at least one shift register for performing normalization and/or shifting operation (e.g., a left shift, a right shift, etc.). In embodiment, the collective logic device 460 further includes an arbiter device 450. The arbiter device is described in detail below in conjunction with FIG. 5. In one embodiment, the collective logic device 460 is fully pipelined. In other words, the collective logic device 460 is divided by stages, and each stage concurrently operates according to at least one clock cycle. In a further embodiment, the collective logic device 460 is embedded and/or implemented in a 5-Dimensional torus network.

Figure 5:
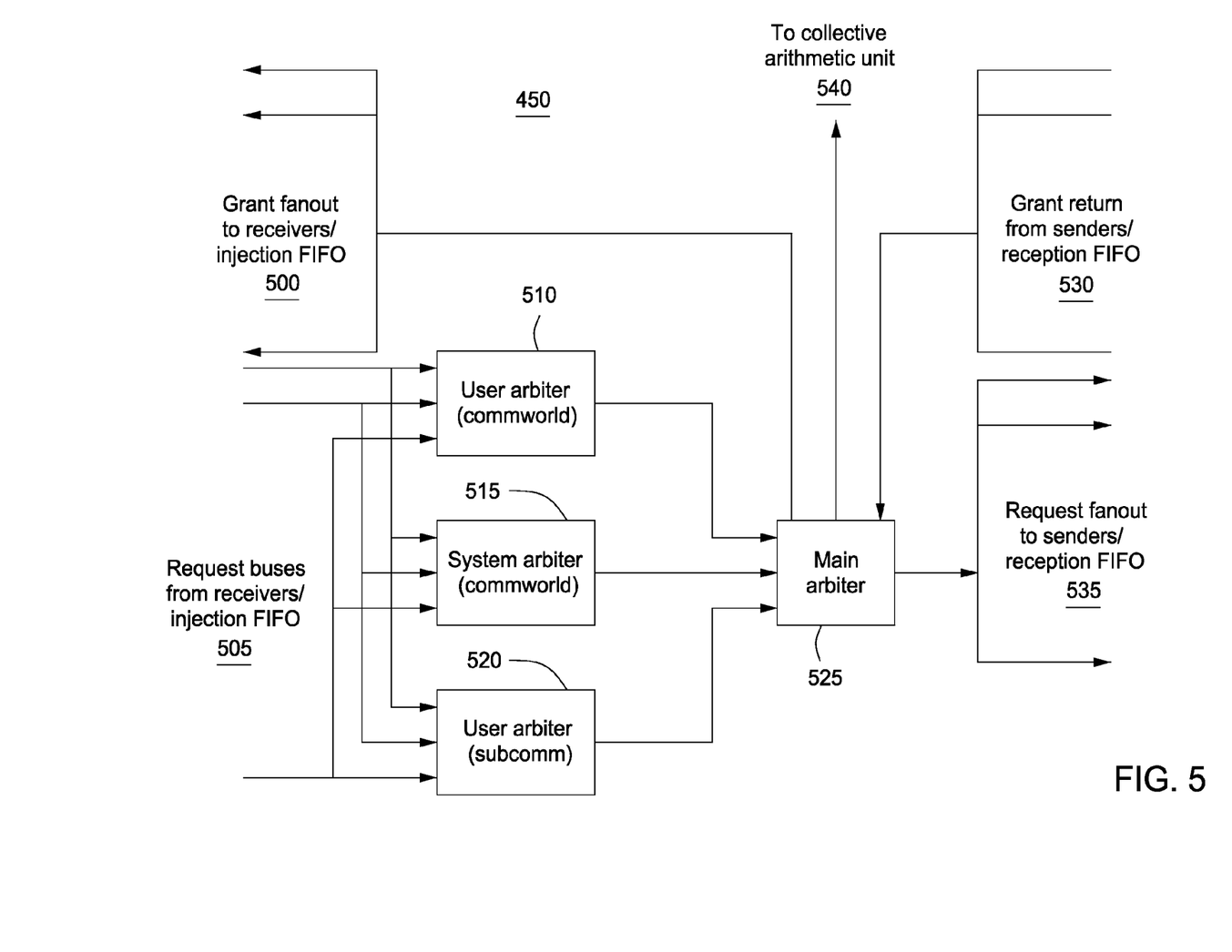
FIG. 5 is one embodiment of an arbiter.

FIG. 5 illustrates an arbiter device 450 in one embodiment. The arbiter device 450 controls and manages the collective logic device 460, e.g., by setting configuration bits for the collective logic device 460. The configuration bits define, without limitation, how many FP shifters (e.g., an FP shifter 410) are used to convert the inputs 400 to integer numbers, how many adders (e.g., an adder 480) are used to perform an addition of the integer numbers, etc. In this embodiment, an arbitration is done in two stages: first, three types of traffic (user, system, subcomm) arbitrate among themselves; second, a main arbiter 525 chooses between these three types (depending on which have data ready). The "user" type refers to a reduction of network traffic over all or some computing nodes. The "system" type refers to a reduction of network traffic over all or some computing nodes while providing security and/or reliability on the collective logic device. The "subcomm" type refers to a rectangular subset of all the computing nodes. However, the number of traffic types is not limited to these three traffic types. The first level of arbitration includes a tree of 2-to-1 arbitrations. Each 2-to-1 arbitration is round-robin, so that if there is only one input request, it will pass through to a next level of the tree, but if multiple inputs are requesting, then one will be chosen which was not chosen last time. The second level of the arbitration is a single 3-to-1 arbiter, and also operates a round-robin fashion.

Once input requests has been chosen by an arbiter, those input requests are sent to appropriate senders (and/or the reception FIFO) 530 and/or 550. Once some or all of the senders grant permission, the main arbiter 525 relays this grant to a particular sub-arbiter which has won and to each receiver (e.g., an injection FIFO 500 and/or 505). The main arbiter 525 also drives correct configuration bits to the collective logic device 460. The receivers will then provide their input data through the collective logic device 460 and an output of the collective logic device 460 is forwarded to appropriate sender(s).

Figure 6:
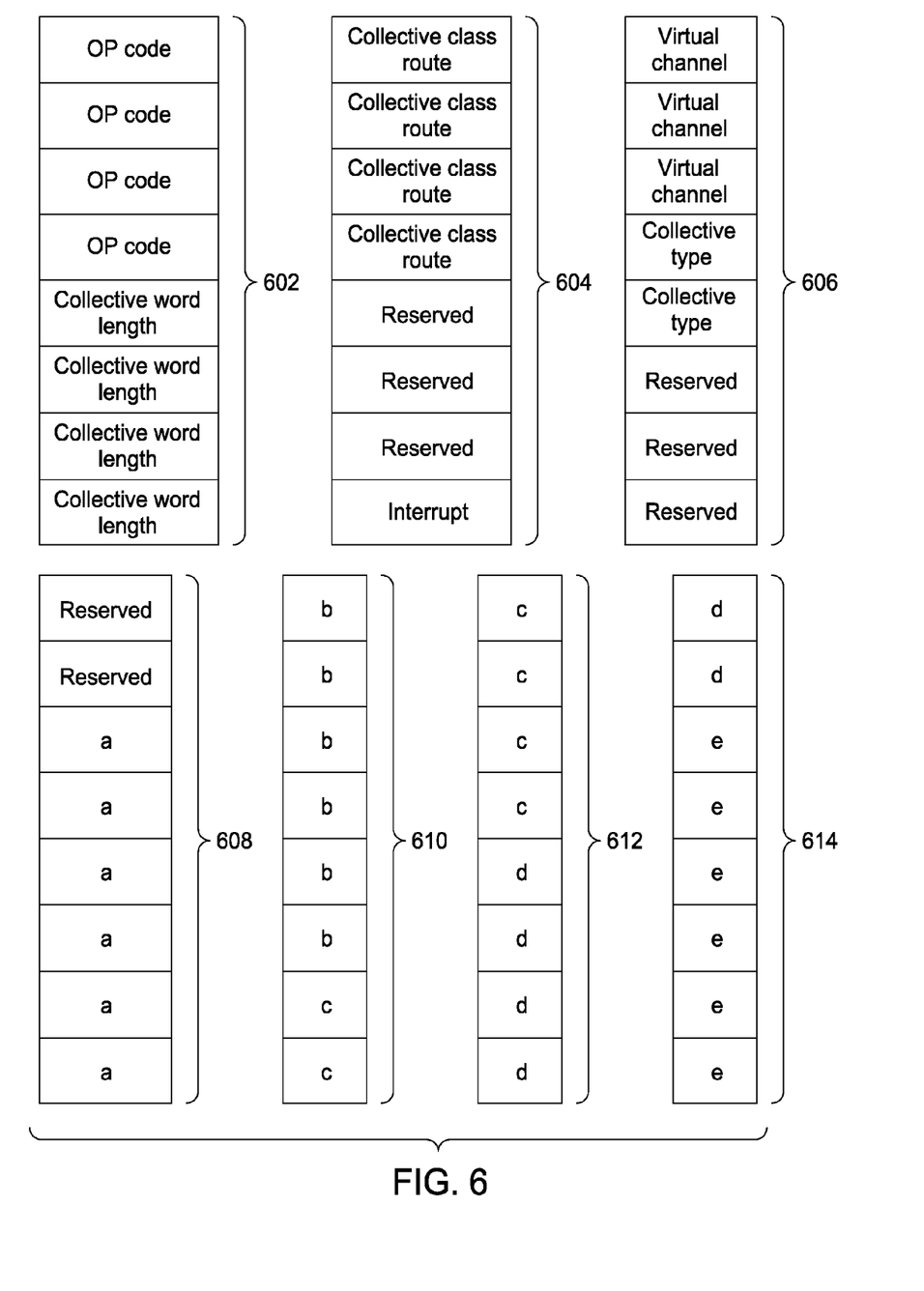
FIG. 6 is one embodiment of a network header for collective packets.

FIG. 6 is one embodiment of a network header 600 for collective packets. In one embodiment, the network header 600 comprises twelve bytes. Byte 602 stores collective operation (OP) codes. Collective operation codes include bitwise AND, OR, and XOR operations, unsigned add, unsigned min, unsigned max, signed add, signed min, signed max, floating point add, floating point min, and floating point max operations.

Byte 604 comprises collective class route bits. In one embodiment, there are four collective class route bits that provide 16 possible class routes (i.e., 2^4=16 class routes). Byte 606 comprises bits that enable collective operations and determine the collective operations mode, i.e., "broadcast", "reduce" and "all reduce modes". In one embodiment, setting the first three bits (bits 0 to 2) of byte 604 to '110' indicates a system collective operation is to be carried out on the data packet. In one embodiment, setting bits 3 and 4 of byte 606 indicates the collective mode. For example, setting bits 3 and 4 to '00' indicates broadcast mode, '11' indicates reduce, and '10' indicates all-reduce mode.

Bytes 608, 610, 612 and 614 comprise destination address bits for each dimension, a through e, within a 5-dimensional torus. In one embodiment, these address bits are only used when operating in "reduce" mode to address a destination node. In one embodiment, there are 6 address bits per dimension. Byte 608 comprises 6 address bits for the 'a' dimension, byte 610 comprises 6 address bits for the 'b' dimension and 2 address bits for the 'c' dimension, byte 612 comprises 4 address bits for the 'c' dimension and 4 address bits for the 'd' dimension, and byte 614 comprises 2 address bits for the 'd' dimension and 6 address bits for the 'e' dimension.

Figure 7:
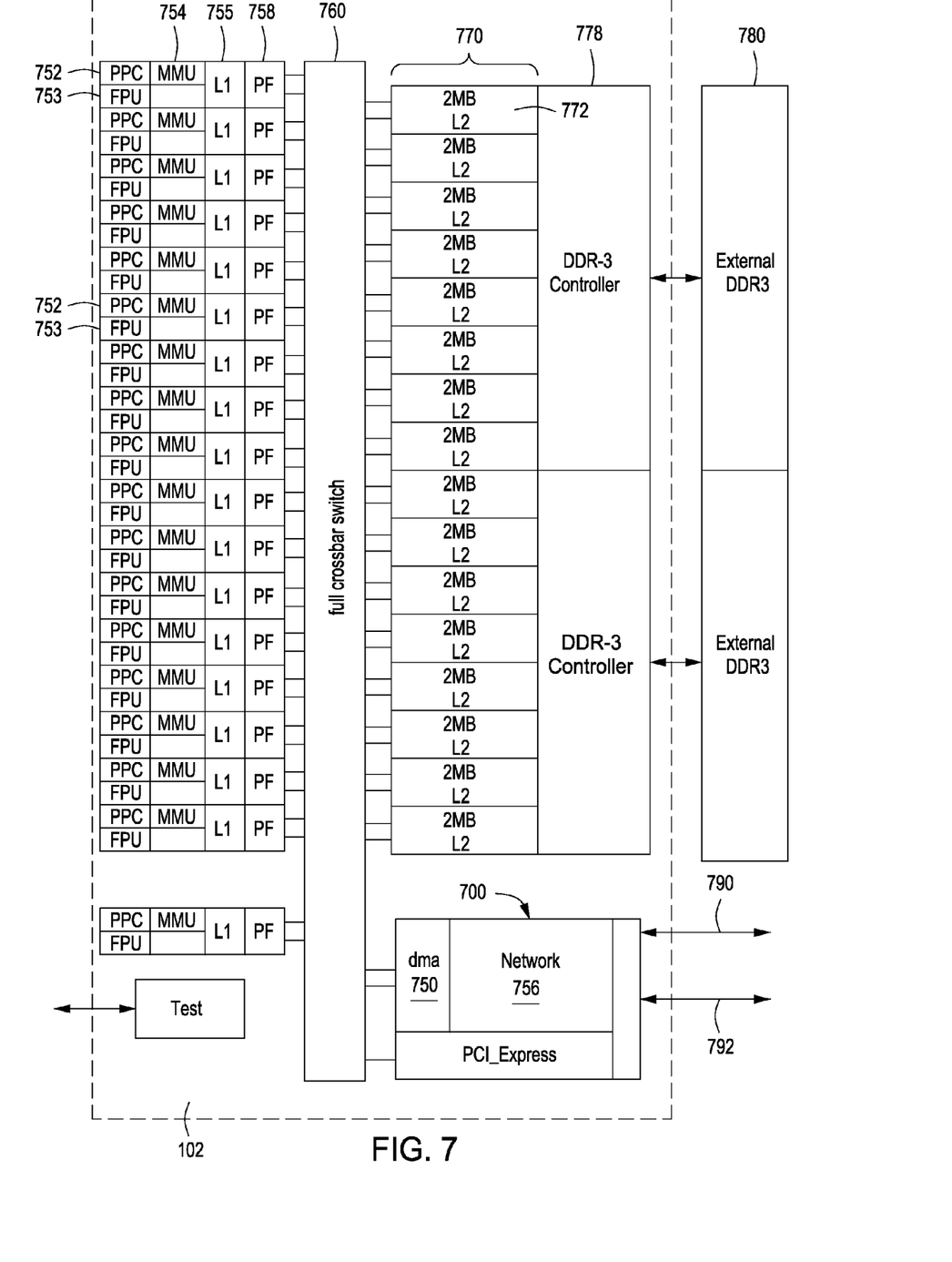
FIG. 7 illustrates the overall architecture of a multiprocessor computing node.

FIG. 7 shows the overall architecture of the multiprocessor computing node 102 implemented in a parallel computing system in which the present invention is implemented. In one embodiment, the multiprocessor system implements a BLUEGENE™ torus interconnection network, which is further described in the journal article 'Blue Gene/L torus interconnection network' N. R. Adiga, et. al., IBM J. Res. & Dev. Vol. 49, 2005, the contents of which are incorporated by reference in its entirety. Although the BLUEGENE™/L torus architecture comprises a three-dimensional torus, it is understood that the present invention also functions in a five-dimensional torus, such as implemented in the BLUEGENE™/Q massively parallel computing system comprising compute node ASICs (BQC), each compute node including multiple processor cores.

The compute node 102 is a single chip ('nodechip') based on low power A2 PowerPC cores, though the architecture can use any low power cores, and may comprise one or more semiconductor chips. In the embodiment depicted, the node includes 16 PowerPC A2 cores running at 1600 MHz.

More particularly, the compute node 102 of the massively parallel supercomputer architecture includes in one embodiment seventeen (16+1) symmetric multiprocessing (SMP) cores 752, each core being 4-way hardware threaded and supporting transactional memory and thread level speculation, including a Quad Floating Point Unit (FPU) 753 on each core (204.8 GF peak node). In one implementation, the core operating frequency target is 1.6 GHz providing, for example, a 563 GB/s bisection bandwidth to shared L2 cache 70 via a full crossbar switch 60. In one embodiment, there is provided 32 MB of shared L2 cache 70, each core having an associated 2MB of L2 cache 72. There is further provided external DDR SDRAM (i.e., Double Data Rate synchronous dynamic random access) memory 780, as a lower level in the memory hierarchy in communication with the L2. In one embodiment, the node includes 42.6 GB/s DDR3 bandwidth (1.333 GHz DDR3) (2 channels each with chip kill protection).

Each FPU 753 associated with a core 752 has a 32 B wide data path to the L1-cache 755, allowing it to load or store 32 B per cycle from or into the L1-cache 755. Each core 752 is directly connected to a prefetch unit (level-1 prefetch, L1P) 658, which accepts, decodes and dispatches all requests sent out by the core 752. The store interface from the core 752 to the L1P 755 is 32 B wide and the load interface is 16 B wide, both operating at the processor frequency. The L1P 755 implements a fully associative, 32 entry prefetch buffer. Each entry can hold an L2 line of 328 B size. The LAP provides two prefetching schemes for the prefetch unit 758: a sequential prefetcher as used in previous BLUEGENE™ architecture generations, as well as a list prefetcher. The prefetch unit is further disclosed in U.S. patent application Ser. No. 11/767,717, which is incorporated by reference in its entirety.

The 32 MB shared L2 is sliced into 16 units, each connecting to a slave port of the switch 760. Every physical address is mapped to one slice using a selection of programmable address bits or a XOR-based hash across all address bits. The L2-cache slices, the L1Ps and the L1-D caches of the A2s are hardware-coherent. A group of 4 slices is connected via a ring to one of the two DDR3 SDRAM controllers 778.

By implementing a direct memory access engine referred to herein as a Messaging Unit, 'MU' such as MU 700, with each MU including a DMA engine 750 and a Network Device 756 in communication with the crossbar switch 760, chip I/O functionality is provided. In one embodiment, the compute node further includes, in a non-limiting example: 10 intra-rack interprocessor links 790, each operating at 2.0 GB/s, i.e., 10*2 GB/s intra-rack & inter-rack (e.g., configurable as a 5-D torus in one embodiment); and, one I/O link 792 interfaced with the MU 200 at 2.0 GB/s (2 GB/s I/O link (to I/O subsystem)) is additionally provided. The compute node 102 employs or is associated and interfaced with an 8-16 GB memory/node (not shown).

Although not shown, each A2 processor core 752 has associated a quad-wide fused multiply-add SIMD floating point unit, producing 8 double precision operations per cycle, for a total of 328 floating point operations per cycle per compute node. A2 is a 4-way multi-threaded 64 b PowerPC implementation. Each A2 processor core 752 has its own execution unit (XU), instruction unit (IU), and quad floating point unit (QPU) connected via the AXU (Auxiliary eXecution Unit) (FIG. 2). The QPU is an implementation of the 4-way SIMD QPX floating point instruction set architecture. QPX is an extension of the scalar PowerPC floating point architecture. It defines 32 32 B-wide floating point registers per thread instead of the traditional 32 scalar 8 B-wide floating point registers.

The compute node 102 implements a direct memory access engine referred to herein as a Messaging Unit 'MU', such as MU 700 to offload the network interface. The MU 700 transfers blocks via three switch master ports between the L2-caches 70 and the reception FIFOs and injection FIFOs of the network interface 756. The MU is controlled by the cores via memory mapped I/O access through an additional switch slave port.

In one embodiment, one function of the messaging unit 700 is to ensure optimal data movement to, and from the network into the local memory system. It supports injection and reception of messages, as well as data prefetching into the memory, and on-chip memory copy. On the injection side, the MU splits and packages messages into network packets, and sends packets to the network respecting the network protocol. On packet injection, the messaging unit distinguishes between packet injection, and memory prefetching packets. A memory prefetch mode is supported in which the MU fetches a message into L2, but does not send it. On the reception side, it receives network packets, and writes them into the appropriate location in memory, depending on the network protocol. On packet reception, the messaging unit 700 distinguishes between three different types of packets, and accordingly performs different operations. The types of packets supported are: memory FIFO packets, direct put packets, and remote get packets.

The messaging unit 700 also supports local memory copy, where the MU copies an area in the local memory to another area in the memory. For memory-to-memory on chip data transfer, a dedicated SRAM buffer, located in the network device, is used. Remote get operations and their corresponding direct put operations can be 'paced' by software to reduce contention within the network. In this software-controlled paced mode, a remote get for a long message is broken up into multiple remote get operations, each remote get operation for retrieving a sub-message. The sub-message remote get operation is only allowed to enter the network if the number of packets belonging to the paced remote get active in the network is less than an allowed threshold. Software has to carefully control the pacing, otherwise deadlocks can occur.

The Messaging Unit 700 functional blocks involved with injection control include the following: Injection control units implementing logic for queuing and arbitrating the processors' requests to the control areas of the injection MU; Reception control units implementing logic for queuing and arbitrating the requests to the control areas of the reception MU; Injection iMEs (injection Message Elements) that reads data from L2 cache or DDR memory and inserts it in the network injection FIFOs. Reception rMEs (reception Message Elements) 720 that reads data from the network reception FIFOs, and inserts them into L2. In one embodiment, there are 16 rMEs, one for each network reception FIFO. A DCR (Device Control Register) Unit is provided that includes DCR registers for the MU 700.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit,' 'module' or 'system.' Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction operation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction operation system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 1 through 7. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be operated substantially concurrently, or the blocks may sometimes be operated in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A computer implemented method for constructing routes for data packets in a multi-dimensional computer network, said network comprising a plurality of interconnected compute nodes, said network overlayed by one or more subrectangles for performing collective operations, the method comprising:
routing a data packet among nodes along one dimension towards a root node, each node having input and output communication links, said root node not having any outgoing uplinks;
classifying the data packet into one of three classes, the three classes including: a first class associated with a reduction in a network traffic in the multi-dimensional computer network, a second class associated with security and reliability of each node in the multi-dimensional computer network while reducing the network traffic in the multi-dimensional computer network, a third class associated with a subset of nodes in the multi-dimensional computer network;
determining, based on a class of the classified data packet, whether the classified data packet can be further routed along the one dimension in the multi-dimensional computer network and if so, further routing the classified data packet according to the class of the classified data packet toward an edge of a subrectangle for the one dimension;
while routing the classified data packet according to the class of the classified data packet toward the edge of the subrectangle for the one dimension, determining at each node if the classified data packet has reached the edge of the subrectangle for the one dimension, and if the classified data packet has reached the edge of the subrectangle for the one dimension, determining if the classified data packet has reached the root node, and if the classified data packet has not reached the root node, routing the classified data packet among nodes along another dimension towards the root node.

2. The method of claim 1, further comprising:
further routing the classified data packet according to the class of the classified data packet toward a predefined coordinate for the one dimension, determining at each node if the classified data packet has reached the predefined coordinate for the one dimension, and if the classified data packet has reached the predefined coordinate for the one dimension, determining if the classified data packet has reached the root node, and if the classified data packet has not reached the root node, routing the classified data packet among nodes along another dimension towards the root node, wherein the predefined coordinate for the one dimension is the same for the one or more subrectangles.

3. The method of claim 1, wherein routing the classified data packet along the one dimension towards the root node is done on one or more uplinks, and when the classified data packet reaches the root node, routing the classified data packet on one or more downlinks in an opposite direction of the one or more uplinks.

4. The method of claim 1, further comprising selecting an order of the dimensions in which to route the classified data packet for the one or more subrectangles in a predetermined manner.

5. The method of claim 4, wherein the predetermined manner is routing the classified data packet in direction of an 'e' dimension, and if routing the classified data packet in direction of the 'e' dimension is not possible, then routing the classified data packet in direction of an 'a' dimension, and if routing the classified data packet in direction of the 'a' dimension is not possible, then routing the classified data packet in direction of a 'b' dimension, and if routing the classified data packet in direction of the 'b' dimension is not possible, then routing the classified data packet in direction of a 'c' dimension, and if routing the classified data packet in direction of the 'c' dimension is not possible, then routing the classified data packet in direction of a 'd' dimension.

6. The method of claim 1, wherein the classified data packet has reached the root node, further comprising routing the classified_data packet on one or more downlinks in a predetermined manner.

7. The method of claim 6, wherein the predetermined manner is routing the classified data packet in direction of an 'd' dimension, and if routing the classified data packet in direction of the 'd' dimension is not possible, then routing the classified data packet in direction of an 'c' dimension, and if routing the classified data packet in direction of the 'c' dimension is not possible, then routing the classified data packet in direction of a 'b' dimension, and if routing the classified data packet in direction of the 'b' dimension is not possible, then routing the classified data packet in direction of a 'a' dimension, and if routing the classified data packet in direction of the 'a' dimension is not possible, then routing the classified data packet in direction of an 'e' dimension.

8. The method of claim 1, further comprising:
communicating one or more data packets from a leaf node or intermediate node to the root node on one or more uplinks, said leaf node or intermediate node performing at least one logic operation on the one or more data packets to produce a single output data packet;
performing at least one logic operation on the data packets at the root node to produce a single output data packet at the root node; and
broadcasting the single output data packet produced at the root node to all the nodes on one or more downlinks, said one or more downlinks being different physical links from the one or more uplinks.

9. The method of claim 1, further comprising:
communicating a data packet from any node to the root node on one or more uplinks; and
broadcasting the communicated data packet from the root node to all the nodes on one or more downlinks, said one or more downlinks being different physical links from the one or more uplinks.

10. The method of claim 1, further comprising:
communicating one or more data packets from a leaf node or intermediate node to the root node on one or more uplinks, said leaf node or intermediate node performing at least one logic operation on the one or more data packets to produce a single output data packet;
performing at least one logic operation on the data packets at the root node to produce a single output data packet at the root node; and
communicating the single output data packet produced at the root node to a destination compute node on one or more downlinks, said one or more downlinks being different physical links from the one or more uplinks.

11. A computer program product for constructing routes for data packets in a multi-dimensional computer network, said network comprising a plurality of interconnected compute nodes, said network overlayed by one or more subrectangles for performing collective operations, comprising:
a non-transitory storage medium readable by a processor and storing instructions for operation by the processor for performing a method comprising:
routing a data packet among nodes along one dimension towards a root node, each node having input and output communication links, said root node not having any outgoing uplinks;
classifying the data packet into one of three classes, the three classes including: a first class associated with a reduction in a network traffic in the multi-dimensional computer network, a second class associated with providing security and reliability to each node in the multi-dimensional computer network while reducing the network traffic in the multi-dimensional computer network, a third class associated with routing the data packet in a subset of nodes in the multi-dimensional computer network;
determining, based on a class of the classified data packet, whether the classified data packet can be further routed along the one dimension in the multi-dimensional computer network and if so, further routing the classified data packet according to the class of the classified data packet toward an edge of a subrectangle for the one dimension;
while routing the classified data packet according to the class of the classified data packet toward the edge of the subrectangle for the one dimension, determining at each node if the classified data packet has reached the edge of the subrectangle for the one dimension, and if the classified data packet has reached the edge of the subrectangle for the one dimension, determining if the classified data packet has reached the root node, and if the classified data packet has not reached the root node, routing the classified data packet among nodes along another dimension towards the root node.

12. The computer program product of claim 11, wherein the processor further perform a step of:
further routing the classified data packet according to the class of the classified data packet toward a predefined coordinate for the one dimension, determining at each node if the classified data packet has reached the predefined coordinate for the one dimension, and if the classified data packet has reached the predefined coordinate for the one dimension, determining if the classified data packet has reached the root node, and if the classified data packet has not reached the root node, routing the classified data packet among nodes along another dimension towards the root node, wherein the predefined coordinate for the one dimension is the same for the one or more subrectangles.

13. The computer program product of claim 11, wherein routing the classified data packet along one dimension towards the root node is done on one or more uplinks, and when the classified data packet reaches the root node, routing the classified data packet on one or more downlinks in an opposite direction of the one or more uplinks.

14. The computer program product of claim 11, further comprising selecting an order of the dimensions in which to route the classified data packet for the one or more subrectangles in a predetermined manner.

15. The computer program product of claim 14, wherein the predetermined manner is routing the classified data packet in direction of an 'e' dimension, and if routing the classified data packet in direction of the 'e' dimension is not possible, then routing the classified data packet in direction of an 'a' dimension, and if routing the classified data packet in direction of the 'a' dimension is not possible, then routing the classified data packet in direction of a 'b' dimension, and if routing the classified data packet in direction of the 'b' dimension is not possible, then routing the classified data packet in direction of a 'c' dimension, and if routing the classified data packet in direction of the 'c' dimension is not possible, then routing the classified data packet in direction of a 'd' dimension.

16. The computer program product of claim 11, wherein the classified data packet has reached the root node, further comprising routing the classified data packet on one or more downlinks in a predetermined manner.

17. The computer program product of claim 16, wherein the predetermined manner is routing the classified data packet in direction of an 'd' dimension, and if routing the classified data packet in direction of the 'd' dimension is not possible, then routing the classified data packet in direction of an 'c' dimension, and if routing the classified data packet in direction of the 'c' dimension is not possible, then routing the classified data packet in direction of a 'b' dimension, and if routing the classified data packet in direction of the 'b' dimension is not possible, then routing the classified data packet in direction of a 'a' dimension, and if routing the classified data packet in direction of the 'a' dimension is not possible, then routing the classified data packet in direction of an 'e' dimension.

18. The computer program product of claim 11, further comprising:
communicating one or more data packets from a leaf node or intermediate node to the root node on one or more uplinks, said leaf node or intermediate node performing at least one logic operation on the one or more data packets to produce a single output data packet;
performing at least one logic operation on the data packets at the root node to produce a single output data packet at the root node; and
broadcasting the single output data packet produced at the root node to all the nodes on one or more downlinks, said one or more downlinks being different physical links from the one or more uplinks.

19. The computer program product of claim 11, further comprising:

communicating a data packet from any node to the root node on one or more uplinks; and broadcasting the communicated data packet from the root node to all the nodes on one or more downlinks, said one or more downlinks being different physical links from the one or more uplinks.

20. The computer program product of claim 11, further comprising:

communicating one or more data packets from a leaf node or intermediate node to the root node on one or more uplinks, said leaf node or intermediate node performing at least one logic operation on the one or more data packets to produce a single output data packet;

performing at least one logic operation on the data packets at the root node to produce a single output data packet at the root node; and communicating the single output data packet produced at the root node to a destination compute node on one or more downlinks, said one or more downlinks being different physical links from the one or more uplinks.

21. A system comprising a multi-dimensional computer network, said network comprising a plurality of interconnected compute nodes, said network having one or more subrectangles comprising a plurality of nodes, each subrectangle for performing collective operations and each node within each of the said subrectangles comprising:

a processor operable to route a data packet among nodes along one dimension towards a root node, each node having input and output communication links, said root node not having any outgoing uplinks, an arbiter operable to classify the data packet into one of three classes, the three classes including: a first class associated with a reduction in a network traffic in the multi-dimensional computer network, a second class associated with providing security and reliability to each node in the multi-dimensional computer network while reducing the network traffic in the multi-dimensional computer network, a third class associated with routing the data packet in a subset of nodes in the multi-dimensional computer network;

the arbiter operable to determine, based on a class of the classified data packet, whether the classified data packet can be further routed along the one dimension in the multi-dimensional computer network and if so, further routing the classified data packet according to the class of the classified data packet toward an edge of a subrectangle for the one dimension;

while routing the classified data packet according to the class of the classified data packet toward the edge of the subrectangle for the one dimension, each node in the computer network operable to determine if the classified data packet has reached the edge of the subrectangle for the dimension, and if the classified data packet has reached the edge of the subrectangle for the dimension, determine if the classified data packet has reached the root node, and if the classified data packet has not reached the root node, route the classified data packet among nodes along another dimension towards the root node.

22. The system of claim 21, wherein routing the classified data packet along the one dimension towards the root node is done on one or more uplinks, and when the classified data packet reaches the root node, routing the classified data packet on one or more downlinks in an opposite direction of the one or more uplinks.

23. The system of claim 21, wherein the classified data packet has reached the root node and the classified data packet is then routed on one or more downlinks in a predetermined manner.

24. The system of claim 23, wherein the predetermined manner is routing the classified data packet in direction of an 'd' dimension, and if routing the classified data packet in direction of the 'd' dimension is not possible, then routing the classified data packet in direction of an 'c' dimension, and if routing the classified data packet in direction of the 'c' dimension is not possible, then routing the classified data packet in direction of a 'b' dimension, and if routing the classified data packet in direction of the 'b' dimension is not possible, then routing the classified data packet in direction of a 'a' dimension, and if routing the classified data packet in direction of the 'a' dimension is not possible, then routing the classified data packet in direction of an 'e' dimension.

* * * * *